(12) United States Patent
Jiang

(10) Patent No.: US 8,482,693 B2
(45) Date of Patent: Jul. 9, 2013

(54) DISPLAY METHOD, DISPLAY DEVICE AND DISPLAY APPARATUS

(75) Inventor: Zhaoguo Jiang, Shanghai (CN)

(73) Assignee: Viatime Media Ltd., George Town, Grand Cayman (KY)

( * ) Notice: Subject to any disclaimer, the term of this patent is extended or adjusted under 35 U.S.C. 154(b) by 232 days.

(21) Appl. No.: 12/811,645

(22) PCT Filed: Jan. 4, 2008

(86) PCT No.: PCT/CN2008/070029
§ 371 (c)(1),
(2), (4) Date: Jul. 2, 2010

(87) PCT Pub. No.: WO2009/086737
PCT Pub. Date: Jul. 16, 2009

(65) Prior Publication Data
US 2010/0296023 A1 Nov. 25, 2010

(51) Int. Cl.
*G02F 1/1333* (2006.01)

(52) U.S. Cl.
USPC .......................................................... 349/58

(58) Field of Classification Search
None
See application file for complete search history.

(56) References Cited

U.S. PATENT DOCUMENTS

| | | | | |
|---|---|---|---|---|
| 4,811,008 A * | 3/1989 | Woolfolk | ....................... | 345/111 |
| 5,526,016 A * | 6/1996 | Nakagiri et al. | ............... | 345/111 |
| 5,627,563 A * | 5/1997 | Nakagiri et al. | ............... | 345/111 |
| 5,638,084 A * | 6/1997 | Kalt | ................................. | 345/31 |
| 5,943,033 A * | 8/1999 | Sugahara et al. | ................ | 345/85 |
| 6,081,249 A * | 6/2000 | Harris | ............................. | 345/85 |
| 6,567,060 B1 * | 5/2003 | Sekiguchi | ....................... | 345/87 |
| 7,121,454 B2 * | 10/2006 | Sugahara et al. | ................ | 234/85 |
| 2003/0052855 A1 * | 3/2003 | Amemiya et al. | ............. | 345/108 |
| 2007/0075922 A1 * | 4/2007 | Jessop | ............................. | 345/49 |

* cited by examiner

*Primary Examiner* — Sung Pak
(74) *Attorney, Agent, or Firm* — Finnegan, Henderson, Farabow, Garrett & Dunner, LLP

(57) ABSTRACT

A display method, a display device and a display apparatus are provided. The display method comprises: providing a white reflection plate which can reflect light by itself to generate white light; providing color transparent plates on or outside the white reflection plate, so that corresponding color is displayed when the white light transmits through the color transparent plates.

24 Claims, 8 Drawing Sheets

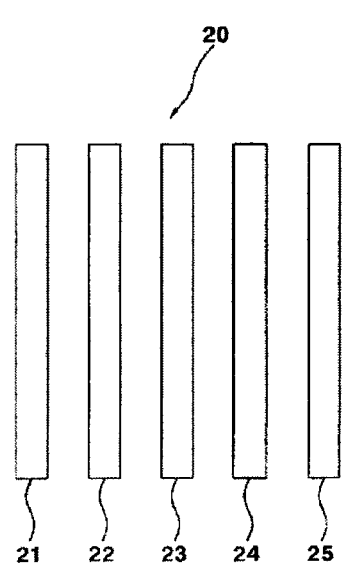
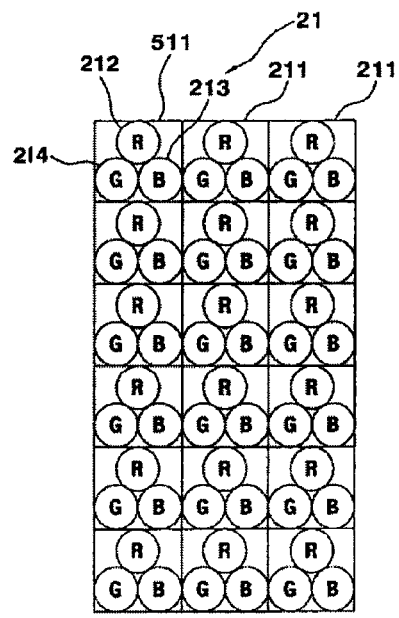
Fig. 2A    Fig. 2B
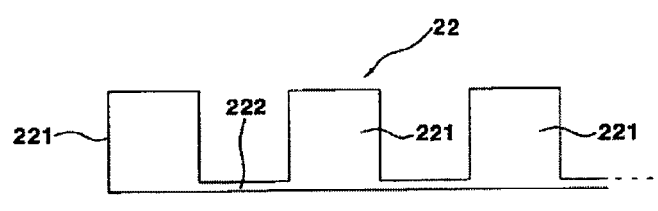
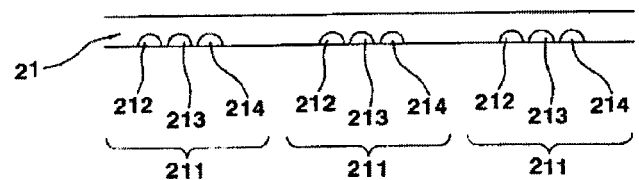
Fig. 2C

DISPLAY METHOD, DISPLAY DEVICE AND DISPLAY APPARATUS

TECHNICAL FIELD

The present invention relates to a Display Method, a Display Device and a Display Screen.

TECHNICAL BACKGROUND

A conventional display device comprises an LCD, an LED, PDP, and OLED. The display device can display texts and images by driving liquid crystal, plasma, LED, neon, light source and so on.

For example, an LCD is a widely used display screen such as expressway traffic information displays, weather forecasting displays, police information displays, advertisement or amusement displays downtown, as they need a reduced voltage, consume less energy, do a good performance, emit a relatively high light intensity, and have a uniform lighting surface and a wide range of view. However, as they have a great dispersion angle and a lighting area, they need a lot of LCDs or some great power LCDs, which consume a substantial amount of energy.

Chinese utility model application No. 200620013306.1 with patent publication No. CN 2094180Y discloses an electronic information display screen, for solving the problem of substantial energy consumption. The application is incorporated herein by reference.

As shown in FIGS. 1A and 1B, the display screen comprises a screen 1 comprising an array 2 of LEDs 3 and a controller.

As shown in FIG. 1B, each of the LEDs 3 of the array 2 is disposed to face a concave mirror 4 so that the concave mirror 4 can focus the light emitted from the LED and the focused light can reach far efficiently. It needs less LEDs and a less amount of energy for a good display.

Chinese invention-patent application No. 02142477.2 with patent publication No. CN 1226658C discloses a LCD display device. The application is incorporated herein by reference.

FIG. 2A shows the conventional LCD screen 20 comprising a light emitting array 21, a light guide 22 placed before the light emitting array 21, a first polarizer 23 placed before the light guide 22, an LCD panel 24 placed before the first polarizer 23, and a second polarizer 25 provided before the LCD panel 24.

FIG. 2B shows the light emitting array of the screen in FIG. 2A, and FIG. 2C shows the light guide of the screen in FIG. 2A. As shown in FIGS. 2B and 2C, the light emitting array 21 comprises an individual light source 211 consisting of three light emitting elements of red, blue and green primary colors. Only one of the three primary color light emitting elements is turned on at a time, or all of them are turned on or each of them turned off simultaneously, or any two of them are turned on simultaneously, thereby operating in 8 different lighting manners or arrangements for a color display as desired. The primary color light emitting elements comprise LEDs or OLEDs. A controller is used for controlling the display color and the light intensity.

The above-mentioned conventional light emitting display screens can be used for advertisement display placed outdoors or indoors. But they consume electric power, especially a substantial power when used outdoors. In addition, the display screens glint and cause a light pollution of the denizens in the neighborhoods. When used in expressways, the glinting affects drivers' sight, which could tend to make accidents.

SUMMARY OF THE INVENTION

For overcoming the disadvantages of the prior art, the present invention provides a filtering and reflective display method for a color display as desired, without consuming energy and glinting.

Another object of the invention is to provide a display device comprising an arrangement of a white reflector and some color filters for a color display as desired, which does not need another light source and does not consume any electric power. It is friendly to the environments, of simple configuration and cost-effective, and especially suitable for an advertisement display screen placed outdoors and indoors.

A further object of the invention is to provide a display screen comprising a plurality of display devices, which consumes no electric power and is friendly to the environments.

The invention provides a display method, comprising:
providing a white reflector for reflecting a white light therefrom; and
providing at least one color filter disposed over said reflector so that the reflected white light can pass through said at least one filter to display a color.

The invention also provides a display device, comprising a white reflector for reflecting a white light therefrom; and
at least one color filter disposed over said reflector so that the reflected white light can pass through said at least one filter to display a color.

The invention still also provides a display screen comprising a screen frame, a screen mounted to said screen frame, and a controller installed inside said screen frame, wherein said screen comprises a plurality of display cells connected to said controller and each comprising:
a white reflector for reflecting a white light therefrom; and
at least one color filter disposed over said reflector so that the reflected white light can pass through said at least one filter to display a color.

The invention is advantageous in that a desired color display is made by means of reflecting and passing the sunlight or a white light through color filters overlapped with each other, which does not need another light source and does not consume any electric power. It is friendly to the environments, of simple configuration and cost-effective.

BRIEF DESCRIPTION OF THE DRAWINGS

The drawings will be used to understand the invention without any limit thereto.

FIG. 2A shows another conventional LCD screen;
FIG. 2B shows the light emitting away of the screen in FIG. 2A;
FIG. 2C shows the light guide plate of the screen in FIG. 2A.

PREFERABLE EMBODIMENTS

The present invention will be described particularly with reference to the accompanying drawings for understanding the objects, solutions and advantages of the invention. The below-described embodiments will be used for explaining the invention without limiting thereto.

The following embodiments provide a display method, a display device and a display screen. Hereafter, the invention will be illustrated with reference to the drawings.

Embodiment 1

The invention provides a display method, comprising: providing a white reflector for reflecting a white light therefrom; providing a color filter over the reflector so that the reflected white light can pass through the filter to generate a color display.

The method of passing a white light reflected from a white reflector through a color filter for generating a color display needs no light source and thus consumes no electric power, which is friendly to the environments because of saving energy, compared with a LED display.

There may be one or more color filters provided according to the display colors as desired.

Figure 1A:
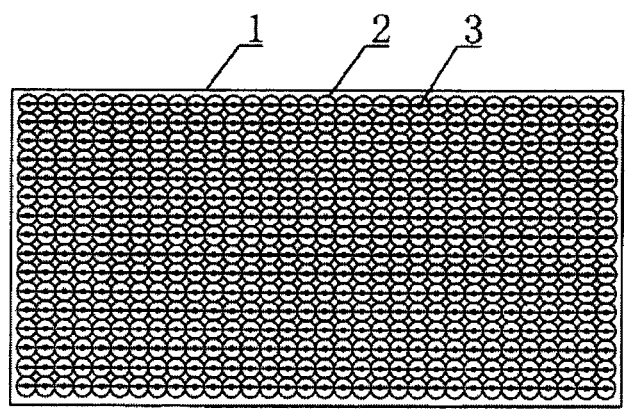
FIG. 1A shows a conventional information display screen.
Figure 1B:
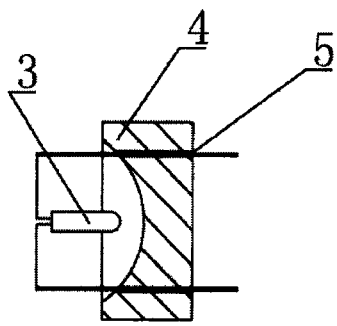
FIG. 1B shows the LEDs of the screen shown in FIG. 1A.
Figure 3A:
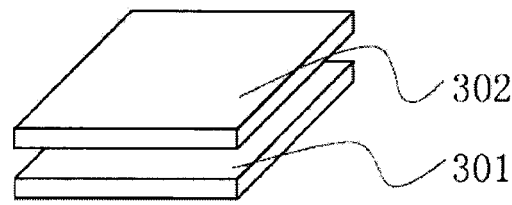
FIGS. 3A-3D shows a display unit according to the invention.
Figure 3B:
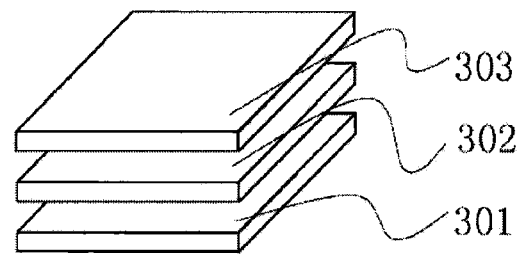
Figure 3C:
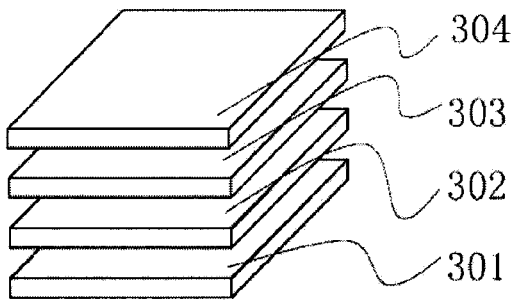

As shown in FIG. 3A, a color filter 302 is provided over a white reflector 301. As shown in FIG. 3B, a color filter 302 and another color filter 303 are provided over a white reflector 301. As shown in FIG. 3C, a color filter 302 and another color filter 303 and still another color filter 304 are provided over a white reflector 301.

Where a plurality of color filters are provided, said plurality of color filters can be arranged as desired, with the sequence of the arrangements not limited. The white reflector and the color filters can be spaced from each other, or can be disposed close to each other.

The white reflector and the color filter can be overlapped entirely or partially with each other. Where a plurality of color filters are provided, these color filters can be overlapped entirely or partially with each other for displaying a desired color, as shown in FIG. 3D.

Figure 3D:
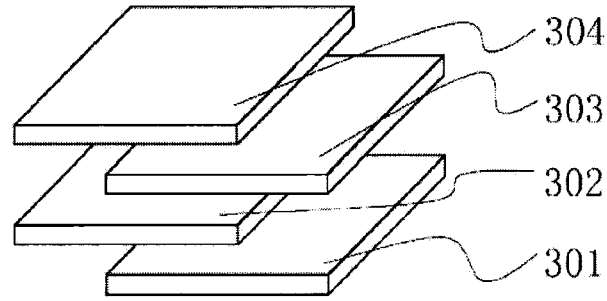

When they are overlapped entirely:

As shown in FIG. 3A, as there is one color filter provided therein, a color is displayed according to the very color filter. As shown in FIG. 3B, as there are 2 color filters provided therein, a color is displayed as resultant from both color filters. As shown in FIG. 3C, as there are 3 color filters provided therein, a color is displayed as resultant from the very 3 color filters.

Where they are overlapped partially as shown in FIG. 3D, a compound color is displayed according to a partial mixture of the several colors displayed by entirely overlapping one, two or three of said color filters. For example, when 50% of one color filter is overlapped with the white reflector or another filter, the displayed color is 50% resultant from said one color filter. The resultant color is different from the color displayed according to the entire overlapping of said one color filter. Therefore, as the percentage of the overlapping of any color filter is varied, the displayed color will be changed, which may be taken for a change in the grey scale of colors. The display method of the invention can provide a colorful display.

The color filters 302, 303 and 304 can be made from any materials suitable for color filters.

In the embodiment, the color filters 302, 303 and 304 are made of color transparent glass or color transparent plastics. Alternatively, the color filters are made of transparent glass or plastics coated with a color filter film.

In the embodiment, the color filters 302, 303 and 304 are made of color transparent sheets or color transparent films, whose transparency is adjusted by a cholesterol or LCD principle.

The white reflector 301 may be made of any materials suitable for white reflectors.

In the embodiment, the white reflector is made of a white plastic plate, a white cardboard, a white aluminum sheet, or a white aluminum alloy sheet. The white reflector 301 may be made of a plastic sheet, a cardboard or an aluminum sheet or an aluminum alloy sheet, which are coated with a white reflector film.

In the embodiment, the white reflector 301 is made of a white reflector film whose reflectivity is adjusted by a cholesterol or LCD principle.

The white reflector and the color filters may be made in any shapes or dimensions without any limit thereto.

The embodiment may be planar, as shown in FIGS. 3A-3D.

The white reflector and the color filters may be semi-cylindrical or cylindrical. Alternatively, the white reflector is cylindrical, while the color filters are semi-cylindrical, as shown in FIGS. 4A-4D.

Figure 4A:
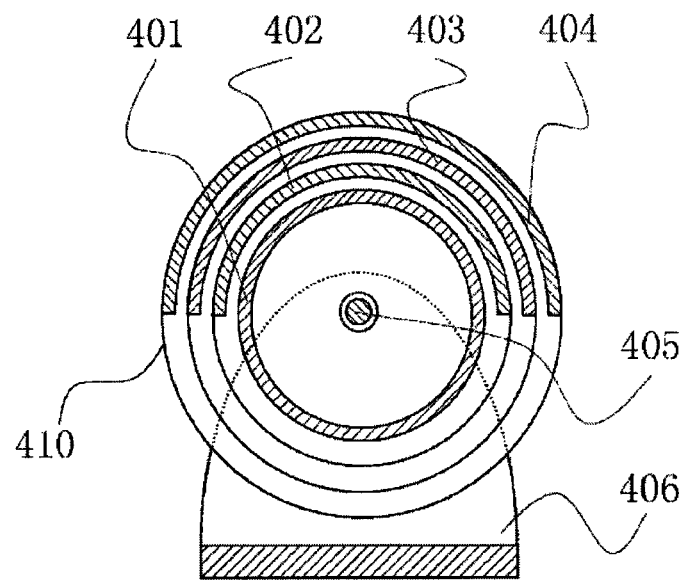
FIGS. 4A and 4B show a semi-cylindrical color filter according to one embodiment of the invention.
Figure 4B:
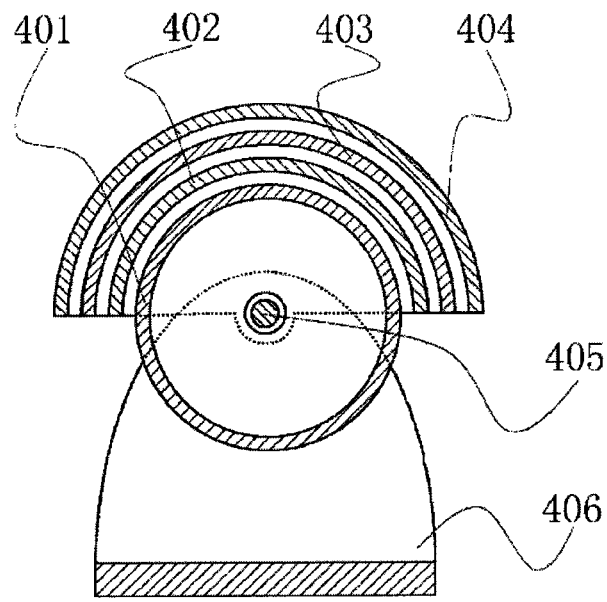
Figure 4C:
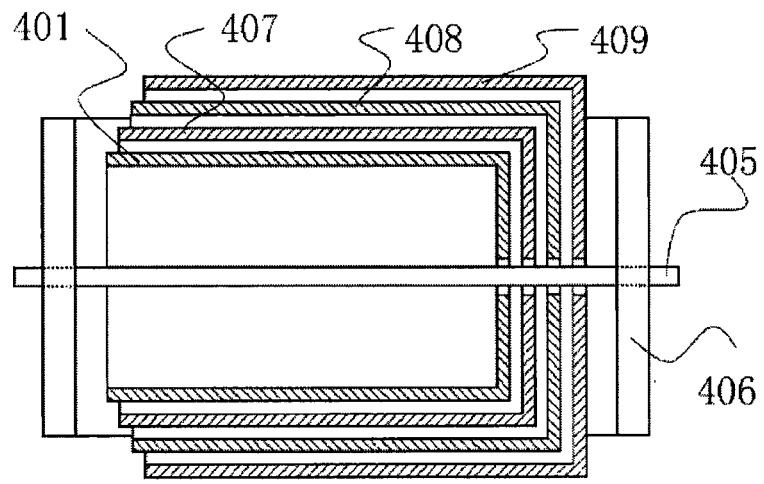
FIG. 4C shows a cylindrical color filter according to another embodiment of the invention.
Figure 4D:
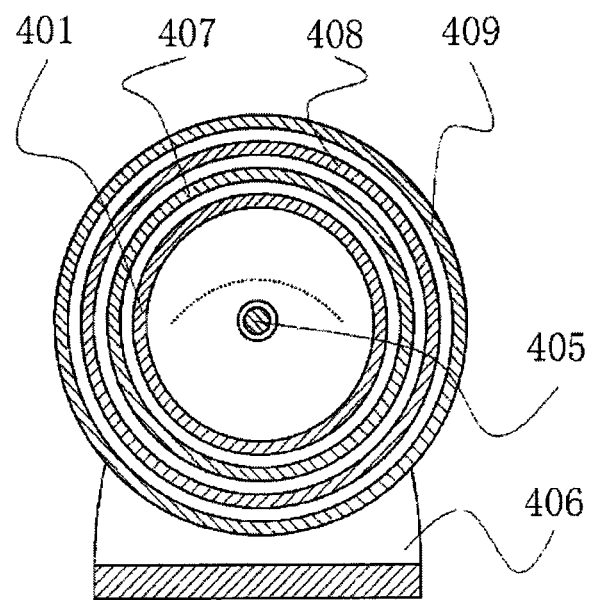
FIG. 4D is a side view of FIG. 4C.

FIGS. 4A and 4B sectionally shows a semi-cylindrical embodiment. FIGS. 4C and 4D are a sectional view of a cylindrical embodiment and a side view thereof. As shown in FIG. 4D, the cylindrical color filter is partially transparent and partially of color filter.

As shown in FIGS. 4A-4D, the method comprises providing a bracket 406 and a shaft 405 supported by the bracket, wherein the shaft supports a white reflector and a plurality of color filters so that the color filters or the color filters and the white reflector can be driven manually or by a motor to rotate about the shaft 405. Where the white reflector 401 is kept together with a color filter, the white reflector 401 rotates along with the color filter. A color is displayed according to the overlapping pattern of the color filters and the white reflector. FIG. 4A shows that the color filters are semi-cylindrical, while the ends of the semi-cylindrical color filters are supported on the shaft 405 by means of circular plates. As shown in FIG. 4B, the ends of the semi-cylindrical color filters are supported on the shaft 405 by means of semi-circular plates.

Consequently, each of the color filters can be disposed behind the white reflector to display no color, or before thereof to display a color resultant from all the color filters, or some of them disposed before to display a color resultant from said some color filters, by rotating the color filters about the shaft 405. By rotating the color filters at angular degrees, various arrangements of overlapping of the color filters and the white reflector can display different colors.

Colors of the color filters may be selected as desired, without being limited. Hereafter, a yellow color, a sky blue color or a pink color will be taken for examples for illustration of the display method.

FIG. 3A shows one color filter. The white reflector 301 reflects a white light. The color filter 302 may generates a yellow color, a sky blue color or a pink color. Thus, overlapping the white reflector 301 and the color filter of yellow color, sky blue color or pink color generates the color of the filter, namely, a yellow color, a sky blue color or a pink color.

FIG. 3B shows 2 color filters. The color filters 302 and 303 are of yellow color and of a pink color, of yellow color and of sky blue color, or of sky blue color and of pink color. Thus, overlapping the white reflector 301 and the color filters of yellow color and pink color generates a red color. Overlapping the white reflector and the color filters of sky blue color and pink color generates a blue color. Overlapping the white reflector and the color filters of yellow color and sky blue color generates a green color. The color filters may be replaced with each other.

FIG. 3C shows 3 color filters. The color filters 302, 303 and 304 are of yellow color, of pink color and of sky blue color respectively. Overlapping the white reflector and the color filters of sky blue color, pink color and sky blue generates a black color. The color filters may be replaced with each other.

All the arrangements of overlapping of the white reflector and those color filters can display the 8 color displays as mentioned above.

Additionally, any partial overlapping of the white reflector and each of the color filters displays a color different from any of the above-mentioned 8 colors. For example, where there is one color filter, which is of yellow color, as shown FIG. 3A, a partial overlapping of the color filter displays a light yellow color. Less overlapped it is, the displayed yellow color is lighter. As shown in FIG. 3B, where there are 2 color filters, which are of yellow color and of pink color respectively, a partial overlapping of both color filters displays a light red. Less overlapped they are, the displayed red color is lighter. As shown in FIG. 3C, where there are 3 color filters, which are of yellow color, of pink color and of sky blue color respectively, a partial overlapping of each of the 3 color filters displays a light black. Less overlapped they are, the displayed black color is lighter.

As shown in FIGS. 4A and 4B, where there are 3 semi-cylindrically shaped color filters of the above-mentioned 3 colors respectively, the 3 semi-cylindrical color filters 402, 403 and 404 can be driven manually or by a motor, which are of yellow color, of sky blue color and of pink color respectively, for example.

Each of the color filters 402, 403 and 404 is rotated into behind, thereby displaying no color. Each of the color filters 402, 403 and 404 is rotated into before, thereby displaying a color resultant from all of them. Each of the color filters 402, 403 and 404 is partially disposed before, thereby displaying a correspondingly resultant color.

For example, anyone of the color filters 402, 403 and 404 is rotated into before, thereby displaying a color corresponding to said one of the color filters 402, 403 and 404, namely, a yellow color, a sky blue color and a pink color.

Any two of the color filters 402, 403 and 404 are rotated into before, thereby displaying a color resultant from said two of the color filters, namely, a red color, a green color and a blue color.

All the color filters 402, 403 and 404 are rotated into before, thereby displaying a color resultant from all the color filters, namely, a black color.

Each of the color filters 402, 403 and 404 is rotated into a different angular position and overlapped variously with the white reflector 401, thereby displaying a different resultant color. For example, only one color filter which is of yellow color is overlapped partially, thereby displaying a lighter yellow color. Less overlapped it is, the displayed color is a lighter yellow color. Each of the two color filters which are of yellow color and of pink color is overlapped partially, thereby displaying a lighter red color. Less overlapped they are, the displayed color is a lighter red color. Each of the three color filters which are of yellow color, of pink color and of sky blue color is overlapped partially, thereby displaying a lighter black color. Less overlapped they are, the displayed color is a lighter black color.

As shown in 4C and 4D, the white reflector 401 is cylindrical, and the color filters 407, 408 and 409 are cylindrical. The color filter 407 consists of a semi-cylindrical filter of yellow color and a transparent semi-cylindrical portion. The color filter 408 consists of a semi-cylindrical filter of sky blue color and a transparent semi-cylindrical portion. The color filter 409 consists of a semi-cylindrical filter of pink color and a transparent semi-cylindrical portion.

For example, by rotating the color filters 407, 408 and 409 about the shaft 405, the transparent portion of each of the color filters 407, 408 and 409 may be placed before, thereby displaying no color. Alternatively, each of the transparent portions is entirely disposed behind, thereby displaying a corresponding color. Additionally, each of the transparent portions is partially disposed behind, thereby displaying another corresponding color. Therefore, the white reflector 401 is overlapped with the color filters 407, 408 and 409 placed in different angular positions, thereby displaying various colors.

Each of the transparent portions is entirely disposed before, thereby displaying a white color of the white reflector 405.

Each of the transparent portions of the color filters 407, 408 and 409 is entirely disposed behind, thereby displaying a black color resultant from the color filters 407, 408 and 409.

Where two of the transparent portions of the color filters 407, 408 and 409 are entirely disposed before, while the other one of the transparent portions of the color filters 407, 408 and 409 is entirely disposed behind, the displayed color is that of said other one color filter whose transparent portion is entirely disposed behind, namely a yellow color, a sky blue color or a pink color.

Where two of the transparent portions of the color filters 407, 408 and 409 are entirely disposed behind, while the other one of the transparent portions of the color filters 407, 408 and 409 is entirely disposed before, the displayed color is a color resultant from said two color filters whose transparent portions are entirely disposed behind, namely a red color, a green color or a blue color.

Where one, two or all of the transparent portions of the color filters 407, 408 and 409 is or are disposed partially before and partially behind, the displayed color is different from a white color, a black color, a yellow color, a sky blue color, a pink color, a red color, a green color and a blue color. For example, the displayed color may be a lighter black color, a lighter yellow color, a lighter red color, a lighter green color, a lighter blue color or others.

The color filters 407, 408 and 409 can be driven manually or by a motor to rotate about the shaft 405. The angular positions of the color filters can be adjusted to display a color as desired.

Various overlapping of a white reflector and some color filters can display different colors without consuming any electric power, which is friendly to the environments.

Embodiment 2

As shown in FIG. 3A, the invention provides a display device, comprising:

A white reflector 301 for reflecting a white light therefrom;

At least one color filter 302 disposed over the white reflector 301 so that the reflected white light can pass through the color filter to display a corresponding color.

It is understood that the white light reflected from the white reflector 301 passes through the color filter to display a color, which does not need another light source and does not consume any electric power. It is friendly to the environments, of simple configuration and cost-effective, compared to a LCD or LED display.

As shown in FIGS. 3A-3C, the number of color filters may be one or more without a limit, and determined from the displayed color as desired.

Where a plurality of color filters are provided as shown FIGS. 3B and 3C, they may overlap the white reflector entirely, or partially as shown in FIG. 3D.

As shown FIGS. 3A-3D, the white reflector and the color filters may be spaced from each other, or kept close to each other.

In the embodiment, the display device further comprises a bracket for supporting the white reflector and the color filters (not shown).

The white reflector and the color filters may be of any shapes and dimensions without being limited.

The white reflector and the color filters are made of the same materials as used in embodiment 1.

The present embodiment is planar, as shown in FIGS. 3A-3D. The color filter is placed over or close to the white reflector.

As shown in FIGS. 4A-4D, the white reflector and the color filters are cylindrical or semi-cylindrical. The color filters are placed surrounding or close to the white reflector.

FIGS. 4A and 4B show semi-cylindrical color filters in section. FIGS. 4C and 4D show cylindrical color filters. As shown in FIG. 4D, each of the cylindrical color filters is partially transparent and partially of color filter.

As shown in FIGS. 4A-4D, the display device comprises a shaft 405, a white reflector 401 and a plurality of color filters 402, 403 and 404, or 407, 408 and 409 connected to and supported about the shaft 405 so that the color filters 402, 403 and 404, or 407, 408 and 409 or the color filters 402, 403 and 404, or 407, 408 and 409 and the white reflector 401 can rotate about the shaft 405. Where the white reflector 401 is kept together with one color filter, the white reflector rotates along with said one color filter. A bracket 406 is connected to the shaft 405 for supporting the shaft 405. The color filters can be rotated manually to display a color as desired, in a manner similar to embodiment 1.

According to a preferable embodiment of the invention, the display device further comprises a driving unit connected to the color filters for rotating the color filters about the shaft 405. The driving unit comprises a rotary motor, preferably a stepper motor. The rotary driving unit may be an electromagnetic thrust that can rotate in a range of 45, 90 and 120 degrees.

According to the last-mentioned embodiment, the driving unit comprises at least one inductive magnet or permanent magnet provided with one of the color filters and disposed perpendicularly to the shaft; at least an electric magnet disposed perpendicularly to the shaft and surrounded with an electric winding connected to a controller for controlling the display screen, wherein the N and S poles of the surrounded magnet cooperate with those of the inductive magnet or permanent magnet. The inductive magnet or permanent magnet provided with said one of the color filters and the surrounded magnet can be taken as a set of magnets.

According to the embodiment, the driving unit includes magnet sets of the same number as that of the color filters. For example, one color filter needs a set of inductive magnet or permanent magnet and surrounded magnet. Two color filters need 2 sets of inductive magnet or permanent magnets and surrounded magnets. Three color filters need 3 sets of inductive magnet or permanent magnets and surrounded magnets. Four color filters need 4 sets of inductive magnet or permanent magnets and surrounded magnets, and so on.

According to another preferable embodiment, besides the magnets provided with the color filters, the white reflector may be provided with a magnet. According to the embodiment, the display device further comprises a driving unit connected to the color filters and the white reflector for rotating the color filters and the reflector about the shaft 405. The driving unit comprises:

At least two inductive magnets or permanent magnets provided with the color filters and the white reflector and disposed perpendicularly to the shaft;

At least two electric magnets disposed perpendicularly to the shaft and surrounded with an electric winding connected to a controller for controlling the display screen, wherein the N and S poles of the surrounded magnets cooperate with those of the inductive magnet or permanent magnets.

The two last-mentioned embodiments of the driving units include a bearing unit for bearing the surrounded magnets.

Figure 5A:
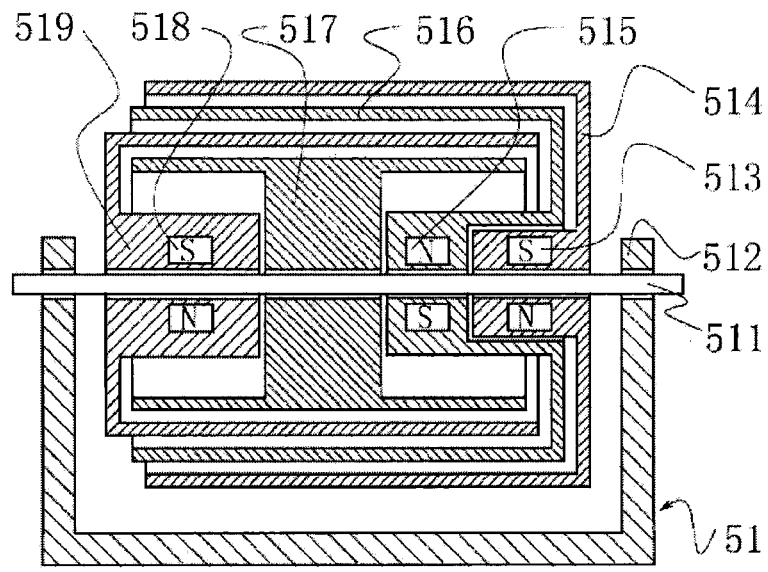
FIGS. 5A and 5B show a color display device according to a further embodiment of the invention.
Figure 5B:
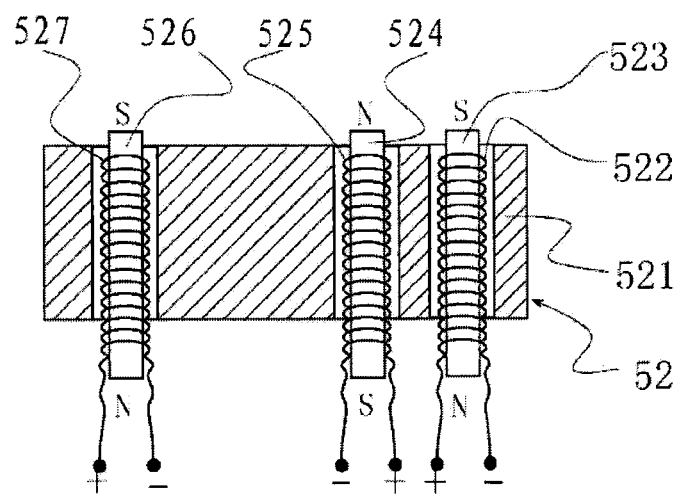

FIGS. 5A and 5B show a cylindrical display device comprising 3 color filters each provided with a magnet. The embodiment has 3 sets of magnets corresponding to the number of the color filters.

According to the embodiment, the display device comprises a rotator 51 and a rotator drive 52 for driving the rotator, wherein the rotator 51 comprises a shaft 511, a first bearing means 512 for supporting the shaft 511, a white reflector 517, a color filter 514 consisting of a transparent semi-cylinder and a semi-cylindrical yellow filter and provided with a magnet bar 513 disposed perpendicularly to the shaft and having an S pole and a N pole, a color filter 516 consisting of a transparent semi-cylinder and a semi-cylindrical blue filter and provided with a magnet bar 515 disposed perpendicularly to the shaft and having an S pole and a N pole, a color filter 519 consisting of a transparent semi-cylinder and a semi-cylindrical pink filter and provided with a magnet bar 518 disposed perpendicularly to the shaft and having an S pole and a N pole, wherein the shaft 511 bears the white reflector 517 and the color filters 517, 516 and 519 for rotating about the shaft 511.

The rotator drive 52 comprises three magnetizable metal bars 523, 524 and 526 each of which is surrounded by an electric winding 522, 525 or 527 and disposed perpendicularly to the shaft and having a N pole and an S pole; and a second bearing means 521 for supporting the three metal bars 523, 524 and 526. The S and N poles of the magnetizable metal bars 523, 524 and 526 are faced with the S and N poles of the magnetic bars 513, 515 and 518 provided with the rotator 51.

As the direction of the electric current through each of the windings 522, 525 and 527 is alternated so that the ends of the metal bars 523, 524 and 526 are polarized alternatively to drive the rotator 52 and hence magnetic bars 512, 515 and 518 provided with the color filters 514, 516 and 519, the color filters 514, 516 and 519 are rotated about the shaft 511.

The metal bars 523, 524 and 526 of the drive 52 and the magnetic bars 513, 515 and 518 of the rotator 51 comprise a driving unit for the color filters 514, 516 and 519. Thus, every display cell may be provided with such a driving unit for driving the display cell.

Additionally, such a rotator 51 may comprise an individual display unit (a display cell), while such a drive 52 may be taken as a driving unit. Where a display screen comprises a plurality of display cells or rotators 51, a driving unit, a driving unit line or a driving unit column consisting of one or more driving units the number of which is less than that of the rotators, or an array of driving units, is placed behind the display screen, so that it can be moved to behind one of the display cells, display cell lines or display cell columns of the display screen or the array of the display cells for rotating the rotators of the targeted display cells and displaying the color of the cell under the control of a signal.

Each of the color filters 514, 516 and 519 can be disposed behind to display no color. Each of them can be disposed before to display a color resultant from all of them. Some of them can be disposed before to display a color resultant from said some filters. Various overlapping of the color filters 514, 516 and 519 and the white reflector 517 can display different colors, as described in embodiment 1.

Furthermore, the color filters 514, 516 and 519 may be of any colors to display any colors. The number of the color filters provided with magnetic bars and the number of the surrounded magnetizable metal bars disposed perpendicularly to the shaft and having a N pole and an S pole are not only three, may be but also one or more, for example, N, any integer. Various overlapping of the N color filters and the white reflector can display different colors resultant therefrom.

The magnetic bars 513, 515 and 518 provided with the color filters 514, 516 and 519 are made of a ferrite, a ferrite alloy, an Nd—Fe—B alloy, a permanent magnet or another magnetic material.

The metal bars 523, 524 and 526 are made of a silicon steel, a ferrite, a ferrite alloy, or another magnetizable material.

The windings 522, 525 and 527 surrounding the metal bars are made of a copper, an aluminum, a Cu—Al composite material, or another conductor material.

The first bearing means 512 and the second bearing means 521 may be provided separately, forming two separate means for an assembly, or fixed integrally to each other for providing a single display unit, which may be called a display pixel or cell.

Consequently, the white light reflected from the white reflector 301 passes through the color filter to display a color, which does not need another light source and does not consume any electric power. It is friendly to the environments, of simple configuration and cost-effective, compared to a LCD or LED display. Various overlapping of the white reflector and the color filters rotated to different angular positions can display different colors.

Embodiment 3

Figure 6A:
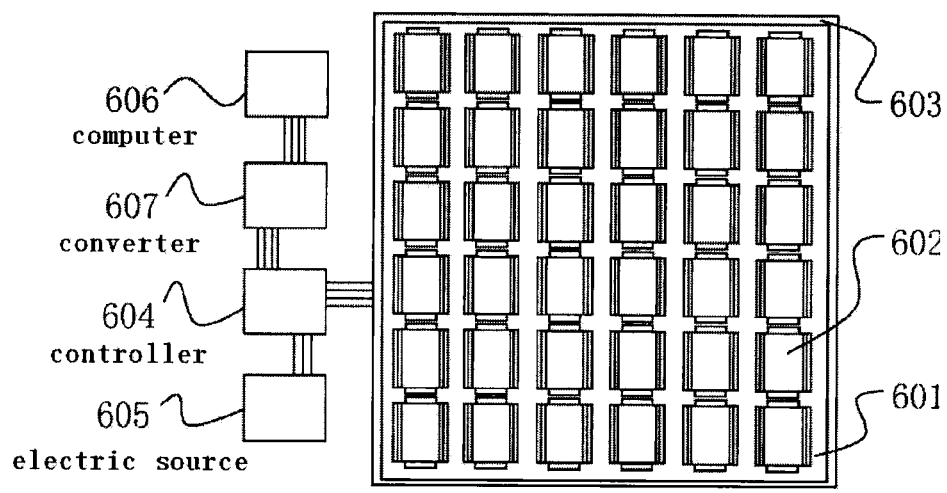
FIGS. 6A and 6B show a display screen according to an additional embodiment of the invention.
Figure 6B:
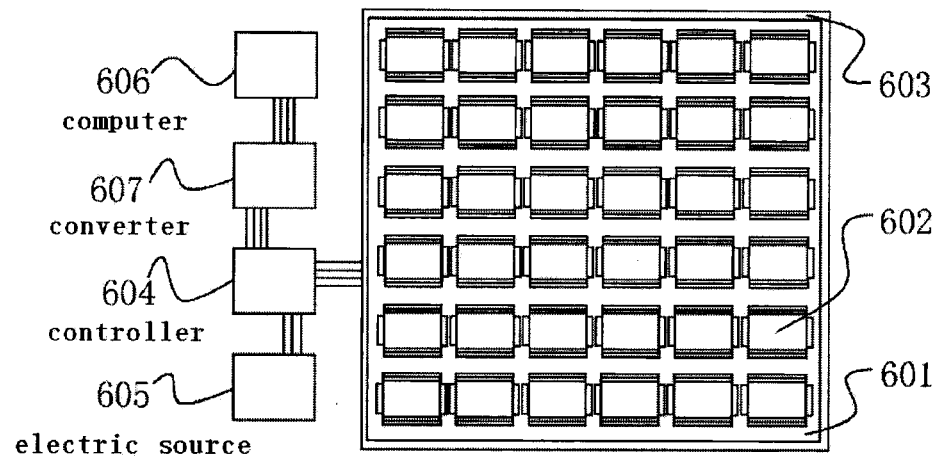

The invention also provides a display screen, as shown in FIGS. 6A and 6B, comprising a screen frame 603, a screen 601 mounted to the screen frame 603, and a controller 604 installed inside the screen frame 603.

As shown in FIGS. 6A and 6B, the display screen further comprises an electric source 605 for supplying the controller, and a converter 607 for interpreting and transmitting instructions from a computer to the controller. As shown in FIGS. 6A and 6B, a computer 606 is used to instruct and command the controller 607. The controller 604, electric source 605 and converter 607 operate in a well-known manner.

As shown in FIGS. 6A and 6B, the display screen 601 comprises a plurality of display cells 602.

As shown in FIG. 6A, the display screen comprises an array of display cells 602 including a plurality of display cells to form a screen 601. Such display cells 602 may be made according embodiment 2.

The display screen can display different texts or patterns, by means of the display cells 602 displaying various colors. The number of the display cells 602 may be any integer greater than one. The array of display cells may be arranged various and may be of any shapes and dimensions.

According to the embodiment, all the display cells 602 may be arranged in a column as shown in FIG. 6A, or in a line as shown in FIG. 6B.

When the display cells are applied to industrial applications, each of the display cells may be used for a single-point display; two of them may be used for a double-point display resultant therefrom, and the two display cells may be two adjacent cells in a column or line. Three of them may be used for a three-point display resultant therefrom, and the three display cells may be adjacent cells in a column or a line or in both a line and a column. Four of them may be used for a four-point display resultant therefrom, and the four display cells may be adjacent cells in a column or a line or in a square of lines and columns.

The entire display screen is computer-controlled for a display all over the screen.

The display screen data can be transmitted, saved and controlled through a telephone network, a wireless network, wireless transmission, a hard disk, CD and DVD.

Figure 7A:
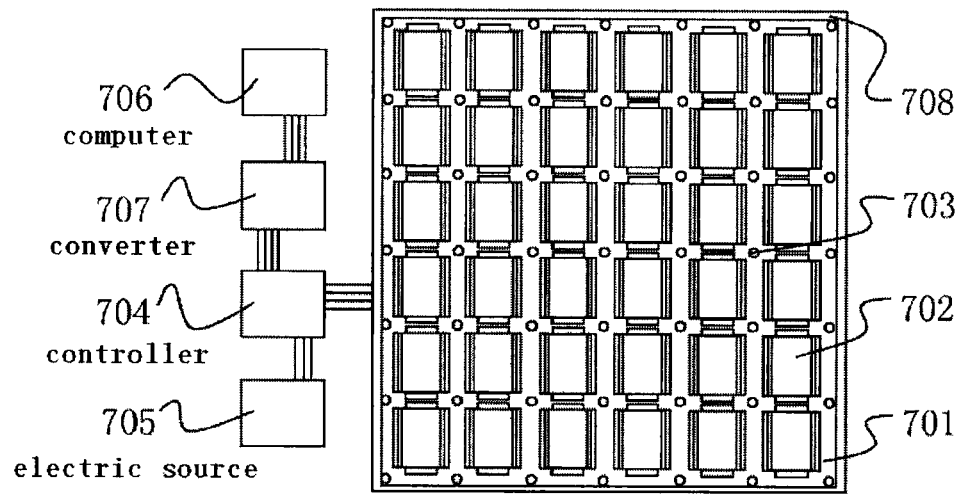
FIGS. 7A and 7B show a display screen according to still another embodiment of the invention.
Figure 7B:
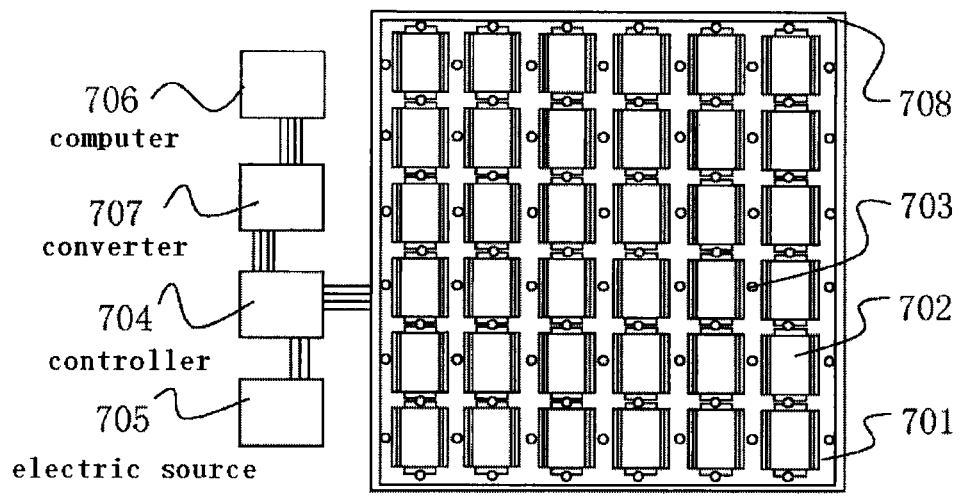

As shown in FIGS. 7A and 7B, the display screen comprises a screen frame 708, a screen 701 mounted to the screen frame 708, and a controller 704 installed inside the screen frame 708.

As shown in FIGS. 7A and 7B, the display screen further comprises an electric source 705 for supplying the controller 704, and a converter 707 for interpreting and transmitting instructions from computer to the controller 704. As shown in FIGS. 6A and 6B, a computer 706 is used to instruct and command the controller 707. The controller 704, electric source 705 and converter 707 operate in a well-known manner.

The display screen 701 comprises a plurality of display cells 702, likewise as shown in FIGS. 6A and 6B.

Additionally, as shown in FIGS. 7A and 7B, the display screen comprises a plurality of LEDs, which are placed at the upper-left, lower left, upper right and lower right corners of each of the display cells 702 of the display screen 701 or between the display cells, so that there is an array of LEDs arranged over the display cell array.

As shown in FIG. 7A, LEDs are placed at the upper-left, lower left, upper right and lower right corners of each of the display cells 702.

As shown in FIG. 7B, LEDs are placed between the display cells 702.

Furthermore, LEDs 703 are monochromatic ones, or may be a LED set of several monochromatic LEDs for emitting a monochromatic light or a color light. Or they may be a single colorful LED or a set of colorful LED.

The array of LEDs can be used for a light source for lighting the entire display screen 701. The array of LEDs may emit a monochromatic light, or emit a color light in cooperation with the entire display screen. Independently of the entire display screen, the LED array may be used as an independent display screen for displaying monochromatic or colorful contents.

As shown in FIGS. 6A, 6B, 7A and 7B, the display screens 601 and 701 are supported by the screen frames 603 and 708 respectively. The display screen and the LED array are connected to the controllers 604 and 704 for controlling the display screen and the LEDs. The electric sources 605 and 705 provide electric supplies for the entire display screen through the controllers 604 and 704. The computers 606 and 706 instruct and command the controllers 604 and 704 through the converters 607 and 707 used to interpret the computer instructions, so that the entire display screen can be computer-controlled. Under the control of the computers 606 and 706, the display screen can display various texts, patterns, pictures and videos. The display screen data and the LED array data can be transmitted, saved and controlled through a network telephone, a wireless network, wireless transmission, a hard disk, CD and DVD.

According to the display cell as shown in FIGS. 5A and 5B, the first bearing means 512 and the second bearing 21 are fixed together to form an integral display cell. A plurality of such display cells are put together to form a display array and hence a transparent and reflective display screen. The driving unit comprises the magnetic bars 513, 515 and 518 provided with the color filters 514, 516 and 519 of the rotor 51, and the rotor drive 52. The rotor of each of the display cells can be driven by the associated rotor drive for displaying different colors, so that the display screen can display various texts, patterns and pictures. The number of the display cells may be any integer greater than one. An array of the display cells may be arranged in any patterns.

Alternatively, the rotors 51 and the rotator drive 52 may be provided separately. As one rotator 51 can be used in one display cell, a plurality of rotors 51 can form an array of display cells, and hence a transparent and reflective display screen.

Where the rotator drive 52 is a separate driving unit, there may be one or more driving units provided. One or more rotator drives may be used to form an array movable behind the display screen, which can move behind one of the display cells and drive the rotor of said one display cell to display a corresponding color under the control of a signal. By means of the rotor drive 52 scanning over the display screen, the rotor of each of the display cells can be driven to display an associated color, so that the display screen can display various texts, patterns and pictures.

Where there is only one rotor drive provided, the rotor drive can be scanned over the display screen so that it can operate any of the display cells.

Where there are a plurality of rotor drives provided, they may be arranged in a line, or a square or rectangular array. The line or array of rotor drives can be scanned over the display screen so that they can operate any of the display cells.

A single rotor drive or an array of rotor drives can be scanned over manually. Alternatively, they can be scanned vertically or horizontally by means of being driven by a motor such as a stepper motor.

Consequently, a color display screen is formed by various overlapping of a white reflector 301 and color filters, which does not need another light source and does not consume any electric power. It is friendly to the environments, of simple configuration and cost-effective, compared to a LCD or LED display.

The embodiments are described to understand the objects, solutions and advantages of the invention, which does not mean to limit the scope of protection as claimed. It shall be appreciated that any modifications, equivalent alternations or improvements made from the spirits and teachings of the invention shall be included in the scope of the invention.

The invention claimed is:

1. A display device, comprising:
   a series of display cells, each comprising:
      a white reflector for reflecting light; and
      at least one color filter disposed over said white reflector so that the reflected light can pass through said at least one filter to display a color,
   wherein each color filter includes a magnetic rotator;
      a control system including a rotator driver for driving the magnetic rotator to move said color filter relative to said white reflector.

2. A display device according to claim 1, further comprising a bracket for supporting said white reflector and said at least one color filter.

3. A display device according to claim 1, wherein the number of said color filters is more than one, and said white reflector and said color filters are overlapped with each other entirely or partially.

4. A display device according to claim 1, wherein said white reflector and said color filter are planar.

5. A display device according to claim 1, wherein said white reflector and said color filter are cylindrical.

6. A display device according to claim 5, further comprising:
   a shaft connected to said color filter and said white reflector for supporting said color filter and said white reflector so that said color filter or said color filter and said white reflector can be rotated about said shaft;
   a bracket connected to said shaft for supporting the shaft.

7. A display device according to claim 6, further comprising a driving unit connected to said color filter for rotating said color filter about the shaft.

8. A display device according to claim 7,
   wherein said magnetic rotator comprises at least one inductive or permanent magnet provided with said color filter; and
   wherein said rotator driver comprises at least one electric magnet with an electric winding connected to a controller for controlling the display device, wherein N and S poles of the electric magnet cooperate with those of the inductive magnet or permanent magnet.

9. A display device according to claim 1, wherein said at least one color filter comprises multiple color filters each including a magnetic rotator, and said rotator driver comprises at least one driver to drive the magnetic rotators.

10. A display device according to claim 9, wherein said rotator driver comprises multiple drivers each corresponding to a magnetic rotator.

11. A display device according to claim 1, wherein said at least one color filter is cylindrical and includes a semi-cylindrial transparent portion.

12. A display screen comprising:
   a screen frame;
   a screen mounted to said screen frame;
   a controller operatively coupled to the screen, wherein said screen comprises a plurality of display cells connected to said controller and each comprising:
   a white reflector for reflecting light; and
      at least one color filter disposed over said reflector, each of the at least one color filter includes a magnetic rotator; and
   a rotator driving system for driving the rotator of each of the at least one color filter,
   wherein the controller is operatively coupled to the rotator driving system to individually control the display cells by rotating the at least one color filter relative to the white reflector.

13. A display screen according to claim 12, wherein said display cell further comprises a bracket for supporting said white reflector and said color filter.

14. A display screen according to claim 12, wherein the number of said color filters is more than one, and said color filters are overlapped with each other entirely or partially.

15. A display screen according to claim 12, wherein said white reflector and said color filter are planar.

16. A display screen according to claim 12, wherein said white reflector and said color filter are cylindrical or semi-cylindrical.

17. A display screen according to claim 12, wherein each of said display cells comprises:

a shaft connected to said color filter and said white reflector for supporting said color filter and said white reflector so that said color filter or said color filter and said white reflector can be rotated about said shaft;

a bracket connected to said shaft for supporting the shaft.

18. A display screen according to claim 12, wherein the rotator driving system comprises one rotator driver for the display cells.

19. A display screen according to claim 12,
wherein said magnetic rotator comprises at least one inductive or permanent magnet provided with said at least one color filter; and
wherein said rotator driving system comprises at least one electric magnet with an electric winding connected to the controller for controlling the display screen, wherein N and S poles of the electric magnet cooperate with those of the inductive magnet or permanent magnet.

20. A display screen according to claim 12,
wherein said magnetic rotator comprises the at least two inductive or permanent magnets provided with said color filter; and
wherein said rotator driving system comprises at least two electric magnets each with an electric winding connected to the controller for controlling the display screen, wherein N and S poles of the electric magnets cooperate with those of the inductive magnet or permanent magnets.

21. A display screen according to claim 12, wherein the rotator driving system comprises multiple rotator drivers, and wherein each of the display cell includes a rotator driver.

22. A display screen according to claim 21, wherein the rotator driver of each of said display cells comprises at least one electric magnet each with an electric winding connected to the controller for controlling the rotator of each display cell.

23. A display screen according to claim 12, wherein said at least one color filter is cylindrical and includes a semi-cylindrical transparent portion.

24. A display screen according to claim 12, wherein the display screen comprises an array of LEDs placed at corners of each of the display cells.

* * * * *